Figure 3:
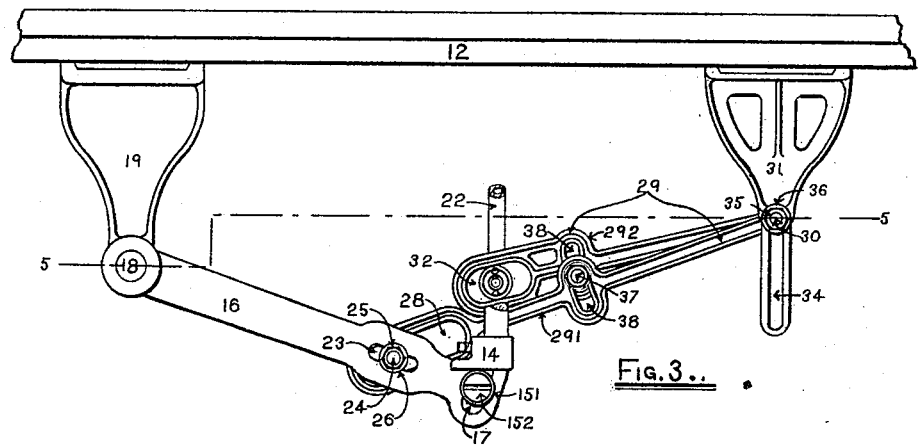

(No Model.) 6 Sheets—Sheet 1.
C. WHITAKER.
SEPARATOR MECHANISM FOR RING SPINNING FRAMES.
No. 498,338. Patented May 30, 1893.
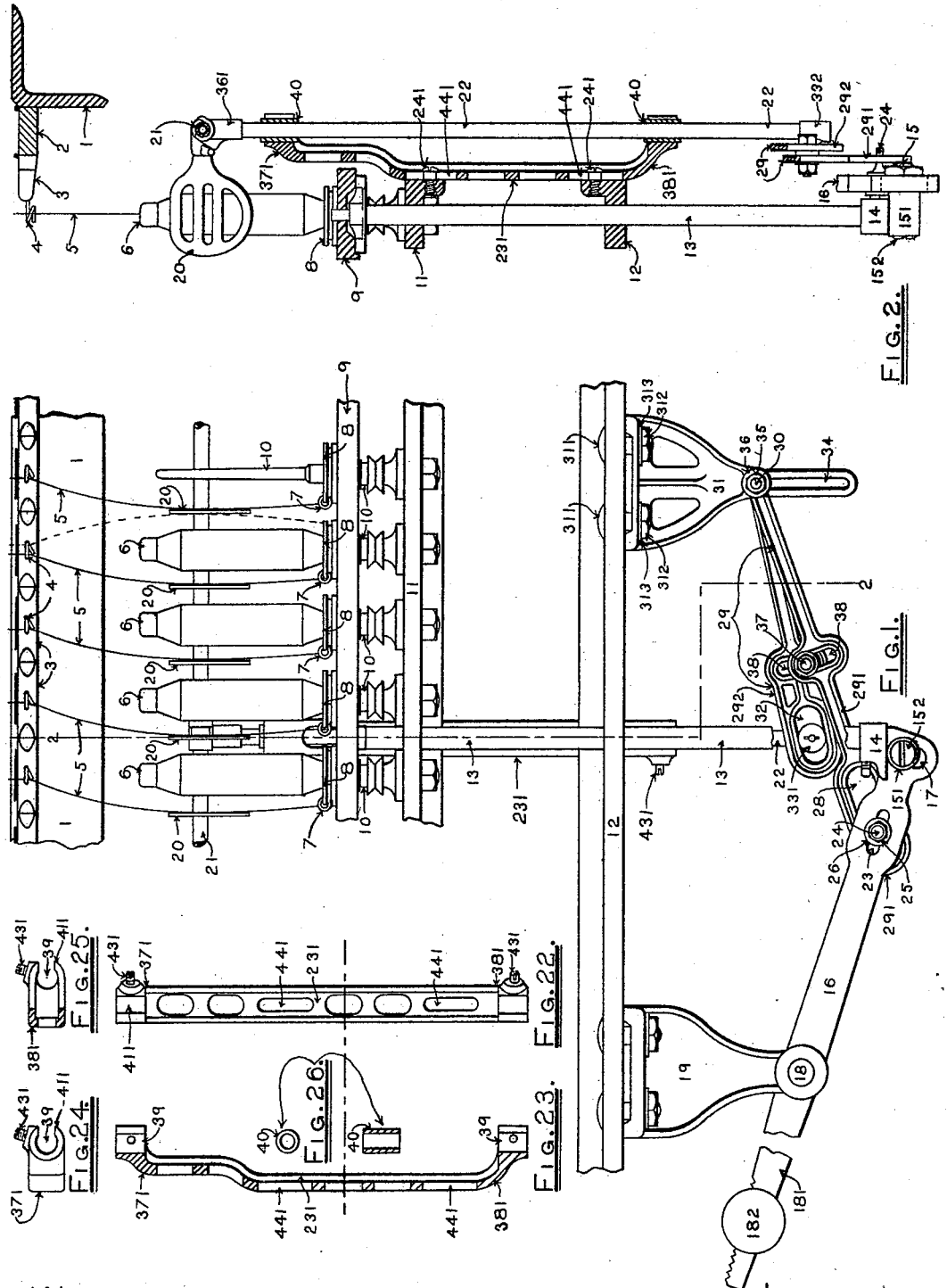
Witnesses.
Mary Caverly
Sam'l G. Stephens
Inventor.
Channing Whitaker (No Model.) 6 Sheets—Sheet 2.

C. WHITAKER.
SEPARATOR MECHANISM FOR RING SPINNING FRAMES.

No. 498,338. Patented May 30, 1893.

WITNESSES.
Mary Caverly
Saml. G. Stephens

INVENTOR.
Channing Whitaker (No Model.) 6 Sheets—Sheet 3.

C. WHITAKER.
SEPARATOR MECHANISM FOR RING SPINNING FRAMES.

No. 498,338. Patented May 30, 1893.

Witnesses.
Mary Caverly
Sam! G. Stephens.

Inventor.
Channing Whitaker.

(No Model.) 6 Sheets—Sheet 4.
C. WHITAKER.
SEPARATOR MECHANISM FOR RING SPINNING FRAMES.
No. 498,338. Patented May 30, 1893.
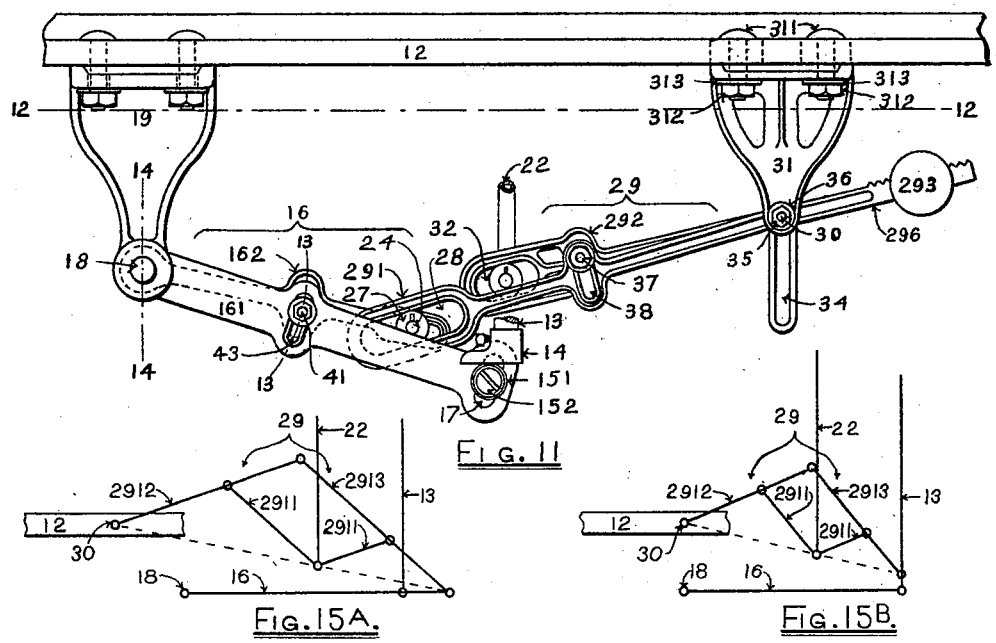
Fig. 11
Fig. 15A. Fig. 15B.
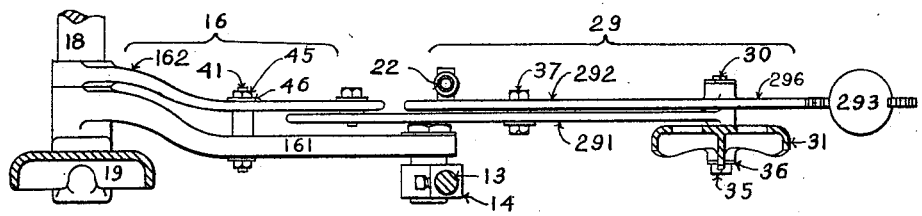
Fig. 12
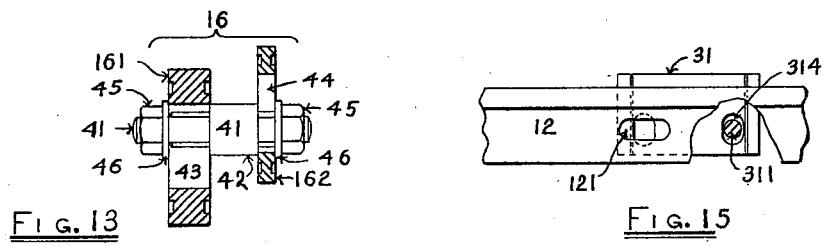
Fig. 13 Fig. 15
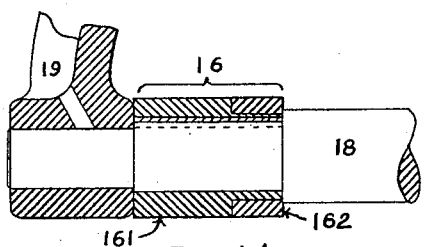
Fig. 14
WITNESSES.
Mary Caverly
Saml. G. Stephens
INVENTOR.
Channing Whitaker (No Model.) 6 Sheets—Sheet 5.
C. WHITAKER.
SEPARATOR MECHANISM FOR RING SPINNING FRAMES.
No. 498,338. Patented May 30, 1893.
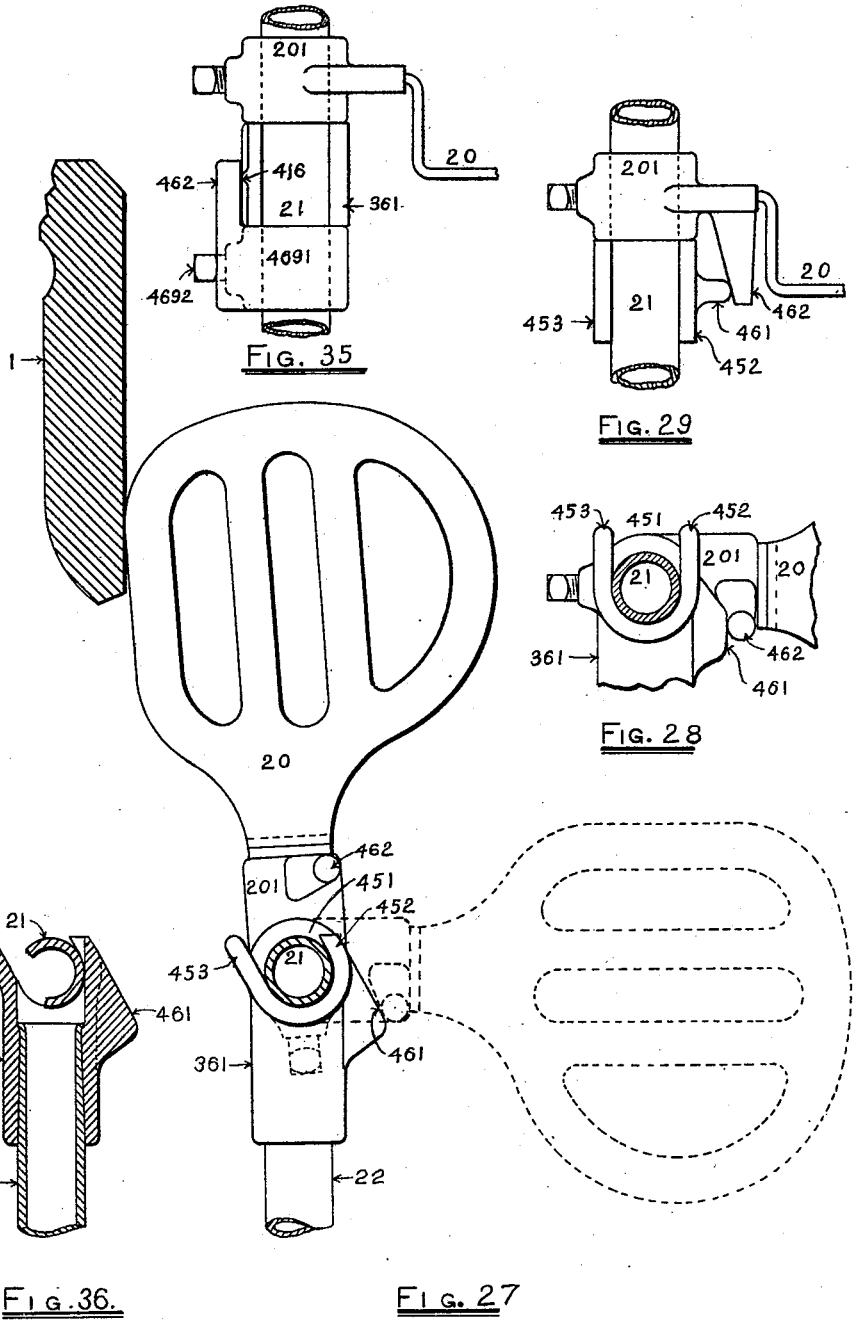
WITNESSES.
Mary Caverly.
Saml. G. Stephens.
INVENTOR
Channing Whitaker.

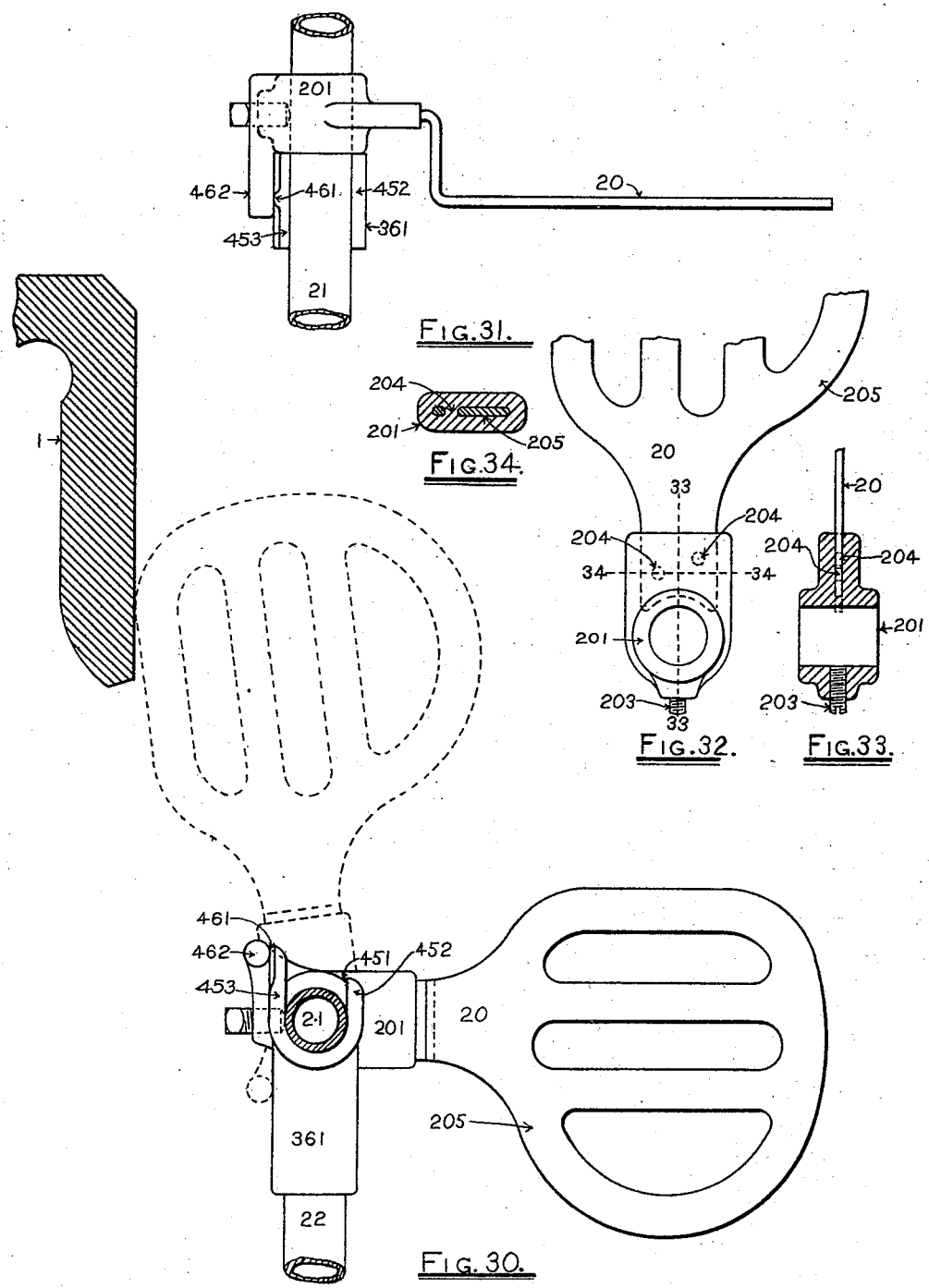

UNITED STATES PATENT OFFICE.

CHANNING WHITAKER, OF TYNGSBOROUGH, ASSIGNOR TO THE LOWELL MACHINE SHOP, OF LOWELL, MASSACHUSETTS.

SEPARATOR MECHANISM FOR RING-SPINNING FRAMES.

SPECIFICATION forming part of Letters Patent No. 498,338, dated May 30, 1893.

Application filed February 10, 1893. Serial No. 461,731. (No model.)

*To all whom it may concern:*

Be it known that I, CHANNING WHITAKER, a citizen of the United States, residing at Tyngsborough, in the county of Middlesex and State of Massachusetts, have invented certain new and useful Improvements in Separator Mechanisms for Ring-Spinning Frames, of which the following is a specification, reference being had therein to the accompanying drawings.

In ring-spinning frames at present in use various devices are employed adjacent to the spindles thereof for the purpose of restricting the ballooning of the yarns which are being spun and wound upon the spindles, and also preventing the yarns of the adjacent spindles from interfering with one another. In the case of some of the earlier applications of such devices to frames of the class specified, the separators were rigidly attached to the ring-rail between the rings, or were elsewhere mounted in positions closely adjacent to the spindles. This proved inconvenient and disadvantageous, for it rendered difficult the cleaning of the ring-rail and rings, promoted the accumulation of flyings and dirt, and interfered with the doffing of the bobbins or cops from the spindles. Afterward, the separators were applied to a rail, shaft, or rod pivotally mounted in bearings projecting from the rear side of the ring-rail and capable of being turned in such bearings to throw the separators upward and backward away from the spindles and the upper surface of the ring-rail. This obviated some of the disadvantages of the arrangement just mentioned, but still, as also occurred in the case of the latter, the weight of the parts which were added to and carried by the ring-rail tended to bend or spring the latter and otherwise interfere with the satisfactory operation of the machine. Later, by mounting the separator-rail, shaft, or rod in bearings carried by the machine-frame, the ring-rail has been in part relieved of the strain thus imposed upon it, the separators being caused to project across the ring-rail as previously, and being struck by the latter in its upward movement so as to rock them vertically during the continued rise of the said rail, the weight of the separators operating to return them to their original position during the descent of the ring-rail. While this arrangement has proved in practice to be superior to the earlier ones, it still causes the weight of the separators, or a part thereof when a counter-balancing weight is applied to the separator-rail, shaft, or rod, to be imposed upon and sustained by the ring-rail at certain times in the movement of the latter, and otherwise is found to fail to answer completely practical requirements. Various improvements thereon have been devised, accordingly, the principal ones having as their main objects to sustain the separators and actuate them by suitable operative connections without any strain or weight being imposed upon the ring-rail.

My present invention relates principally to this class of supporting and actuating mechanisms for the separators of ring-spinning frames, and it has for its main object to provide a simple and convenient improved combination and arrangement of parts whereby the shaft, rod, or rail carrying the separators shall be properly and satisfactorily sustained and moved so as to maintain the separators in proper relation to the spindles, yarn-guides, and ring-rail, at all times during the rise and fall of the ring-rail, which shall not require the use of stops to limit the descent of the separators, which shall possess capacity for certain adjustments that are found to be necessary or convenient in practice, and which shall be of such character as to enable the separators and their supporting-rail to be maintained at all times, if desired, in connection with the actuating devices therefor, and thereby be positively moved in both directions.

Another object of the invention is to provide an improved separator-rod, and an improved means of securing to the ends thereof the parts which are fitted with bearings for the separator-rails and also the parts which are engaged by the operating devices through whose agency the separator-rods are moved up and down.

Another object of the invention is to provide an improved construction and arrangement of guides for the separator-rod whereby to secure greater steadiness than heretofore has been attained, which guides may be adjusted vertically to compensate the vertical shift of the traverse of the separators, and whereby, also, to enable the separator-rod and separators to be disconnected and removed from the said spinning-frame quickly and conveniently when desired, as well as to be replaced in operative relation with the parts of the spinning-frame as readily.

In the class of supporting and actuating mechanisms to which my invention relates it is customary, as in the case of some of the earlier arrangements mentioned herein, so to mount the separators as to enable them to be moved or turned away from between the spindles when desired.

Another of the objects of my invention is to provide in a simple and practical manner for enabling this result to be secured, and also for arresting the movement of the separators both when they are thrown back out of the position they normally occupy between the spindles and when they are restored to their said normal position, as well as for enabling the separator-rail to be taken from its supports at any time and removed from the machine without it being necessary first to move the separators to their inoperative position in order to unlock the rail from its supports.

My invention consists in certain novel features of construction, arrangement, and combination of parts, all of which first will be fully described in connection with the accompanying drawings, in which the same will be found to be clearly illustrated, and then will be particularly pointed out and distinctly defined in the claims at the close of this specification.

Figure 4:
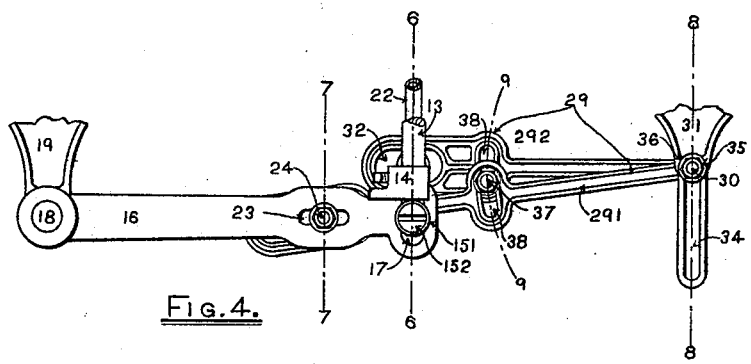
Figure 5:
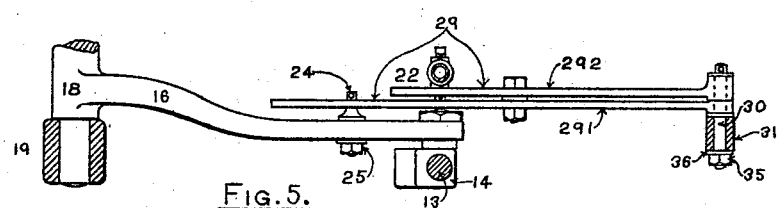
Figures 6, 7, 8, 9:
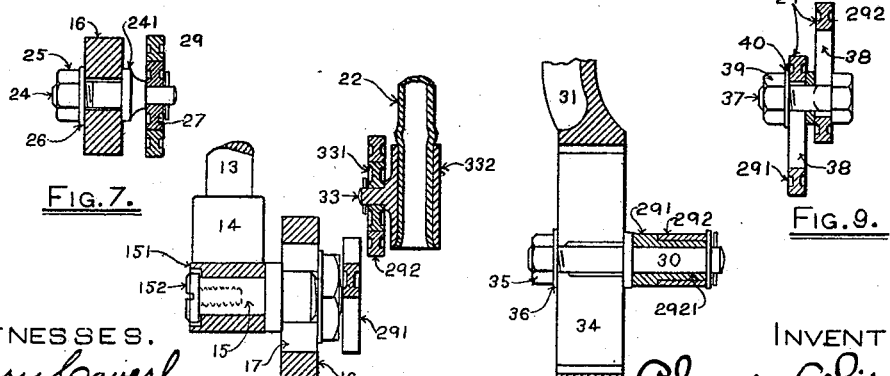
Figure 10:
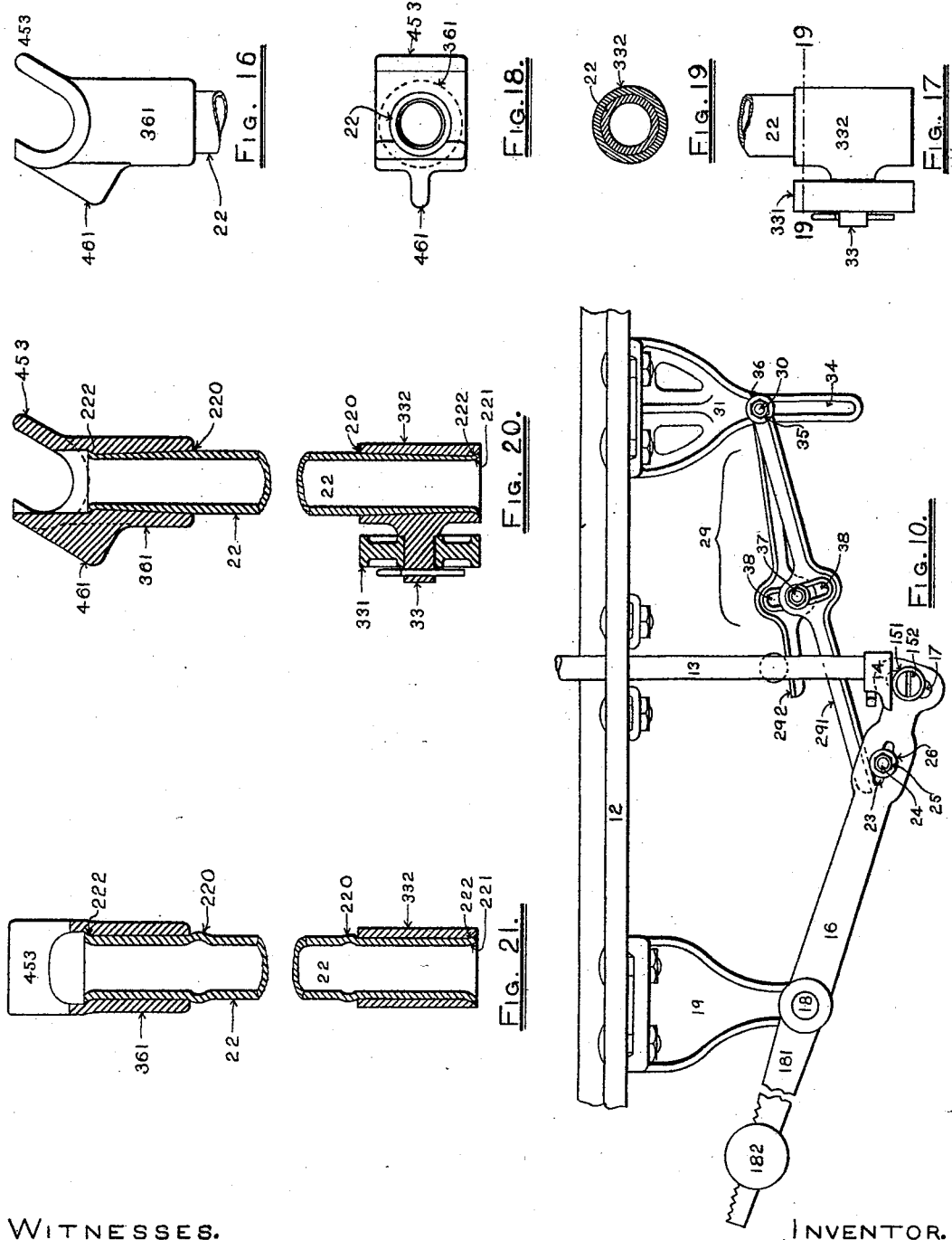

In the drawings, Figure 1 is a view showing in front elevation certain of the usual parts of an ordinary ring-spinning frame, with my invention applied thereto, and Fig. 2 is a view thereof in vertical section on the line 2—2 of Fig. 1. Fig. 3 is a detail view of certain parts embodying the main features of the invention, detached, the said views being intended to present more clearly the relations and mode of operation of the said parts. Fig. 4 is a similar view of the same parts, it showing them in a different position. Fig. 5 is a view thereof in horizontal section on the line 5—5 in Fig. 3. Figs. 6, 7, 8, and 9, respectively, are views in section on the lines 6—6, 7—7, 8—8, 9—9 of Fig. 4. Fig. 10 is a view representing a modified form of a separator-lever. Fig. 11 is a view corresponding in character with Fig. 3, it showing additional features which may be employed if desired. Fig. 12 is a view in horizontal section on the line 12—12 in Fig. 11. Fig. 13 is a view in section on the line 13—13 in Fig. 11. Fig 14 is a view in section on the line 14—14 in Fig. 11. Fig. 15 is a detail view illustrating mainly an adjustable stand or bracket for the separator-lever. Figs. 15$^A$ and 15$^B$ are diagrams showing further modifications. Fig. 16 is a view in side elevation showing the upper end of a hollow or tubular separator-rod, and the socket which is applied thereto. Fig. 17 is a view in side elevation of the lower end of the separator-rod, and the foot applied thereto. Fig. 18 is a view in plan of the parts which are shown in Fig. 16. Fig. 19 is a view in section on the line 19—19 in Fig. 17. Fig. 20 is a view in section of a hollow or tubular separator-rod having the middle portion thereof broken away on account of the length of the rod, and having the socket and foot applied to the ends thereof, the plane of the section being parallel to that of the paper in Figs. 16 and 17. Fig. 21 is a view similar to Fig. 20, with the section in a plane at right angles to the plane of the section represented in Fig. 20, and illustrating a different modification of the securing means. Figs. 22, 23, 24, 25 and 26 are views illustrative of the stand and guides for the separator-rod. Fig. 27 is a view mainly in side elevation but with the separator-rail and roller-beam in section, showing the means for supporting the separator-rail and for stopping it in each of the positions of the separators. Fig. 28 is a detail view in side elevation showing a modification of the construction which is represented in Fig. 27. Fig. 29 is a view in plan of the parts which are shown in Fig. 28. Fig. 30 is a view corresponding in character with Fig. 27, showing a further modification. Fig. 31 is a view in plan of the parts which are shown in Fig. 30, but with the roller-beam omitted. Fig. 32 is a view of a separator, with part of the blade thereof broken away. Fig. 33 is a view in vertical section on line 33—33 of Fig. 32. Fig. 34 is a view in section on line 34—34 of Fig. 32. Fig. 35, is a view similar to Fig. 31, but showing a modification. Fig. 36 is a view in section parallel to the plane of the paper of parts shown in Fig. 27.

In Figs. 1 and 2, 1 is the roller-beam, 2 the thread-board hinged thereto, as usual, 3 the finger-boards hinged as usual to the thread-board, 4 the yarn-guides secured to the finger-boards, 5 the yarns passing from the yarn-guides 4 to the bobbins 6 through the travelers 7 on the rings 8 supported by the ring-rail 9, 10 the spindles on which the bobbins are mounted, 11 the spindle-rail, 12 the lower or guide-rail, 13 the lifting-rod for the ring-rail, 14 the shoe at the lower end of the said rod, 15 the stud upon which, or upon the roller 151 carried thereby, the under surface of the said shoe rests, 152 the flat-headed screw which holds the roller in place upon the stud when the said roller is employed, the threaded part of the said screw being caused to enter a threaded hole in the end of the stud, 16 the cross-shaft arm by which the said stud or roller is carried, 17 the transverse slot in the free end of the said arm in which the said stud is adjustably mounted, and 18 the cross-shaft on which the said arm is secured, the said cross-shaft turning in brackets 19 (only one of which is shown) bolted to the rail 12 and being caused to rock by usual means for the purpose of moving the ring-rail up and down, the cross-shaft being in practice usually provided with an arm 181 on which is mounted adjustably a weight 182 for counterbalancing the parts which are operated by the arm 16.

All of the foregoing parts may be of any usual or preferred construction.

At 20 are shown the separators, at 21 the separator-rail on which the separators are mounted, and at 22 a rod by which the said rail is supported. These parts may be constructed and connected together in any desired manner. For the sake of lightness the rail 21 and rod 22 preferably are made tubular or hollow.

I provide the following improved combination and arrangement of parts for operating the separator-rail and separators: In order to reduce in number as far as possible the moving parts which are employed in a ring-frame, I take the necessary motion for transmission to the separators from the cross-shaft arm 16. Between the said arm 16 and the separator-rod 22 I interpose a second or intermediate lever 29, various forms of which are represented in Figs. 1 to 12, and which I name the separator-lever. The said lever 29 is pivoted, at the end thereof which is farther from the point at which it is acted upon by the arm 16, on the stud or pin 30 carried by the bracket 31 bolted to the lower or guide-rail 12, and from an intermediate point of its length motion is transmitted to the separator-rod 22. The lever 29 enables me to place the separator-rod adjacent to the lifting-rod, and to the rear thereof, and to actuate the separator-rail and separators from the same arm, 16, that actuates the ring-rail and rings, but with a movement bearing a diminished ratio to that of the latter. Therefore, inasmuch as by the use of the said separator-lever the separator-rail and separators are always moved simultaneously with the ring-rail and rings, and always in the same direction with the latter, but through a traverse of less extent, the use of adjustable stops to determine the limit of the descent of the separators, and of adjustable feet on the separator-rod to determine the limit of the ascent thereof, is rendered unnecessary, and the mechanism is simplified by the omission of such features. For actuating the separator-lever 29 from the cross-shaft arm 16, one of these parts is provided with a projection which engages with a suitable portion of the other part. In the drawings I have shown this projection as constituted by a stud or pin 24, and have represented it as carried by the cross-shaft arm 16. With the object in view of transmitting movement at a reduced ratio to the part of the separator-lever with which the stud or pin 24 engages, and thereby aiding in securing the reduced traverse of the separators, the said stud or pin is mounted on the arm 16 at a point intermediate the cross-shaft 18, carrying the arm, and the stud or pin 15 from which the lifting-rod and ring-rail are actuated. To enable this ratio to be varied, and thereby the desired extent of traverse to be communicated to the separators, the stud or pin 24 is made adjustable lengthwise of the arm 16, in the slot 23 that is formed in the arm, it being secured in the desired position of adjustment in the said slot by means of the nut 25 and washer 26 which are placed on its threaded end on the side of the arm 16 which is opposite to that on which is located the shoulder or collar 241 formed on the stud or pin. Or, either conjointly with the foregoing adjustment, or independently thereof, the separator-lever 29 itself may be adjusted in the direction of the length thereof, and so as to shift its pivot or fulcrum toward or from the stud or pin 24, when it is desired to vary the ratio of the length of the vertical motion of the separator-rail and separators to that of the ring-rail and rings. This is permitted by the fact that the rail 12 is made with slots 121 extending lengthwise thereof, and that through these slots pass the stems of the bolts 311, 311, whereby the bracket is clamped to the rail. The said slots are provided in the said rail, together with transverse slots 314 in the bracket, through which the bolts pass also, for convenience in setting the parts and bringing them into desired working relations. The threaded ends of the bolts 311, 311, receive thereon the nuts 312, 312, and washers 313, 313. Usually, in practice, the stud or pin 24 will be furnished with an anti-friction roller 27 on the end thereof which extends into position for acting on the separator-lever 29, and, also, the pin 33 projecting from the separator-rod 22 into proximity to the separator-lever will be provided with a similar roller 331 to contact with the said separator-lever. The pin 33 will usually be provided on a foot 332 which is fitted to the lower end of the separator-rod. The separator-lever 29 may have at its free end a smooth under surface fitted to rest upon the stud or pin 24 or its roller 27, and at an intermediate point in its length on its upper side a similar surface fitted to have the stud or pin 33, or its roller 331, rest thereupon, all as shown clearly in Fig. 10. In this case the separator-lever, separator-rod, and the parts carried thereby, will be moved positively in only an upward direction, and will be caused to descend through the action of gravity. Sometimes it is deemed desirable that positive movement should be communicated to the separators downward as well as upward.

It is found in practice that cotton flyings continually collect upon the surface of the separator-rod, particularly when the said surface is rough or oily. It results, when the bearings through which the separator-rod slides vertically have been too loosely fitted to the said rod in the first instance, or when the said bearings have become too large through the wear incident to use, that the cotton flyings which collect upon the surface of the rod pass in between the rod and the said bearings, thereby clogging the opening between them, and this clogging, if not relieved by the attendant, goes on increasing until the resistance due to it becomes so great as to overcome the tendency of the parts to fall of their own weight after having been raised. Heretofore it has been customary to nearly counterbalance the weight of the parts and to depend upon the unbalanced portion of such weight to carry them down after being lifted, and it has resulted in practice that the parts would not descend as intended when the bearings became clogged, but would remain for some time suspended, and then, perhaps as the result of a jar, go down suddenly with a jerk. If, at such time, through the too great flexibility of the separator-rail some of the separators should strike against the ring-rail the regularity of the winding-on of the yarn would be disturbed. As a complete safeguard against the objectionable results of such clogging, the movements of the separator-rod may be made positive in both directions, so that if, as the result of the clogging, the separator-rod should stick sufficiently to prevent the separators from descending because of the weight of the parts, the machinery will draw them down.

In Figs. 1, 3, 4, 6, 7, and 11 of the drawings I have shown a simple and practical manner in which to connect the operative parts so as to cause the movements of the separators to be positive in both directions. In these figures the studs 24 and 33, with their anti-friction rollers 27 and 331, project into slots 28 and 32 that are formed in the separator-lever 29 and extend longitudinally thereof. As the cross-shaft 18 and its arm 16 are rocked, the roller 27 carried by the said arm plays in slot 28 and transmits its movement to the separator-lever 29, while, as the said lever 29 vibrates, the roller 331 carried by the separator-rod plays in the slot 32 and motion thus is transmitted to the separator-rod and the parts carried thereby.

It is important sometimes to be able so to adjust the parts as to shift or translate vertically the path of the traverse of the separator-rail, either with or without changing the extent of such traverse. The said vertical shift is provided for by the slot 34 in bracket 31, which is provided in order to enable the parts to be fitted properly to the spinning-frame in which they are employed, and in which slot the stud 30 may be secured at the desired point by means of nut 35 and washer 36. By moving the stud 30 up and down in the said slot the proper distance, and thereby raising or lowering the corresponding end of the separator-lever, the separator-lever 29 will be turned around the stud 24 as on a pivot, thereby raising or lowering to a proportional extent the separator-rod and parts supported thereby, and effecting the vertical shift desired. Still greater range of adjustment in this respect is secured by making the separator-lever 29 in two parts or members 291 and 292, the member 291 coacting with the arm 16 and the member 292 coacting with the separator-rod. In the positive mechanism the slot 28 is formed in the member 291 and the slot 32 in the member 292. The two members are fixedly connected together, for instance, as shown in detail in Fig. 9, by means of a bolt 37 passed through slots 38 in both members and receiving thereon a clamping nut 39 and washer 40. In this two-part construction of the separator-lever the member 291 preferably will be formed with a hub portion 2921 upon which the portion 292 will be journaled, as shown in detail in Fig. 8. As will be apparent, if the two parts or members are shifted to different angles relatively to each other the desired adjustments or shifts of the traverse may be effected. If it be so desired, when it is desired to alter the vertical position of the traverse of the separator-rail, the adjustment may be effected by placing the separator-rail in the middle position of its intended path of motion, then setting the pivotal stud 30 at the same level as the stud 33 or roller 331 on the separator-rod 22, thereby placing member 292 of lever 29 in a horizontal position, and then tightening the bolt 37 in the slots 38 in the two parts of the separator-lever.

The cross-shaft arm 16 may, if desired, be made of a two-part construction like the separator-lever, as shown in Figs. 11, 12 and 13, the stud 15 and its roller 151 being carried by one part or member 161 of the said arm, this part or member being keyed to the cross-shaft or otherwise fixed to turn therewith, as in Fig. 14, and the stud 24 and roller 27 being carried by the other part or member 162 thereof, the hub of the latter being sleeved upon a reduced portion of the hub of member 161, and turning freely thereon, as shown in Fig. 14, and the two parts or members 161, 162, being rigidly connected together in proper angular position relatively to each other by proper means, such as, for instance, the bolt 41 having the enlarged middle portion 42 and reduced threaded ends projecting through the slots 43, 44, formed cross-wise in the members 161, 162, and nuts 45 and washers 46 applied to the said threaded ends, all as shown in detail in Fig. 13. This provision for adjustment may be used independently of the other adjustable features herein presented, but as will be apparent from Fig. 11, by using the construction of cross-shaft arm which has just been described, and employing it in combination with the two-part separator-lever and the adjustable stud 24, and pivotal supporting stud 30, the range of adjustment is made more complete and perfect, and the movement, &c., desired may be secured to a nicety. If it be desired, the separator-lever, or one of the parts or members thereof, may be prolonged beyond the pivotal support therefor, as shown at 296 in Figs. 11 and 12, and receive upon such prolongation a movable weight 293, which will serve to counterbalance a part, or, if desired, substantially the whole of the weight of the portion of the separator-lever at the inner side of the said pivotal support, and of the parts supported by such portion of the separator-lever. Usually, however, the counter-weight 182 mounted upon the arm 181, or as otherwise usually connected with the mechanism for operating the ring-rail, will be made sufficient in practice to render the employment of the weight 293 unnecessary.

The principles of my present invention will not be departed from if the separator-lever be given the composite form or structure represented diagrammatically in Figs. 15$^A$ and 15$^B$. In these figures the separator-lever is shown formed of the assemblage of links 2911, 2911, and levers 2912, 2913, jointed together in what will be recognized as the fashion of the "pantograph," one end of the lever 2912 being pivoted to a fixed anchor or abutment, which in practice would be constituted by one of the stationary rails of the machine-frames, or a stand affixed to such a rail or the floor, and one end of the lever 2913 being in operative connection with the cross-shaft arm, while the connection with the separator-rod is made at the joint where the links 2911, 2911, are jointed together. In Fig. 15$^A$ an end of lever 2913 is jointed directly to the cross-shaft arm, but in Fig. 15$^B$ the same end is pivoted to the lifting-rod, the results being substantially the same in the two cases.

The socket 361, which is affixed to the upper end of the separator-rod 22 for the purpose of supporting the separator-rail 21, and the foot 332, which is affixed to the lower end of the separator-rod and fitted for co-action with the devices that actuate the separator-rod, are applied to the said ends and held immovably in place thereon in the particular manner that is clearly shown in Figs. 16 to 21 of the drawings.

The separator-rod is made by me of a very thin wrought-iron or steel tube, in order to save cost and to secure a separator-rod which shall be not only very light but very stiff to resist twisting and cross-bending. The rod near each end thereof is formed with a swell or enlargement 220 which is intended to prevent the part that is to be applied thereto from passing too far on the rod in the direction of the length of the latter. Each end of the rod is passed through a hole in the corresponding part that is to be applied thereto, and the extremity of each end subsequently is expanded forcibly so as to bind the said part onto the rod. Preferably, the socket and foot are countersunk adjacent to the ends of the holes therein, in order to receive the outwardly forced or expanded extremity of the rod.

In Fig. 21 the swell or enlargement 220 adjacent to each end of the rod is shown as formed by bending the wall or shell of the tubular or hollow rod outward, as by force applied from within, the said swell or enlargement being at a sufficient distance from the corresponding end of the rod to determine the proper position of the part which is applied to the said end. In Fig. 20, the swell or enlargement 220 at each end of the rod is shown formed by tapering the portion which fits within the socket or foot, the hole in the latter being made tapering also. In Figs. 20 and 21 I have shown at 221 the expanded extremity of the rod, and at 222—222, the places where the socket and foot are each countersunk for the reception of the expanded extremities.

The separator-rod 22 is maintained in vertical position by the stand 231, and slides up and down through guides in the arms 371 and 381 forming part of the said stand. Each arm of the stand 231 is formed with a vertical circular hole 39, for the passage of the separator-rod, as shown clearly in Figs. 22 to 25, and within this hole is placed a bushing 40, shown separately in Fig. 26, which furnishes the actual bearing for the separator-rod. Each bushing is held in place in its hole 39 by a screw 431 which passes through a threaded hole in the end of the corresponding arm of the stand and takes bearing against the outside of the bushing. The stand 231 is fixed to the rails 11 and 12 by the screws 241, 241, so that the arm 371 shall extend upward to a point just below the lowest point reached by the socket 361 which is affixed to the upper end of the separator-rod for the support of the separator-rail 21, and so that the arm 381 shall extend downward to a point which is just above the highest point reached by the foot 332 on the lower end of the separator-rod. In consequence of the bearings or guides for the separator-rod being as far apart as possible and as close to the ends of such rod as possible, the greatest attainable steadiness of the said rod and the separators carried thereby is secured.

The screws 241, 241, whereby the stand is held to the rails 11, 12, pass through vertically elongated slots 441, 441, in the stand, thus enabling an adjustment of the parts intermediate the separator-rod and the cross-shaft arm 16, which is made for the purpose of shifting the traverse vertically, as aforesaid, to be accompanied by a corresponding and compensating adjustment of the stand in the same direction, when necessary, so as that when a vertical shift of the traverse of the separators is effected, a corresponding adjustment of the stand may be made, and thereby the guides for the separator-rod may at all times be kept located in the proper relative positions. The bushings 40, 40, are slipped onto the separator-rod 22 before the socket 361 and foot 332 both are affixed to the ends of the said rod.

With the object in view of enabling the separator-rod to be disconnected and removed from the spinning frame quickly and conveniently when desired, and to be replaced as readily in operative relations with the parts of the spinning-frame, the following construction is adopted: Through each arm of the stand 231 a slot 411 is formed, this slot opening into the hole 39 in such arm and being of a width to permit the passage of the separator-rod laterally therethrough, but being too narrow to permit of lateral escape of the bushing 40. When it is desired to remove the separator-rod, the screws 431, 431, of the two arms of the stand are turned so as to loosen the bushings 40, 40, which then are lifted out of the holes 39, 39, by being slipped upward on the separator-rod, and the separator-rod 22 then is passed laterally out through the slots 411, 411, thus detaching it from its guides and leaving it free to be removed from the machine. The rod will be restored to its guides and secured in place by performing the operation in reverse order, as will be understood.

The means of supporting the separator-rail upon the separator-rod is shown in Figs. 27, 28, 29, 30, 31, 35 and 36. In each of the forms shown in these figures the socket 361 affixed to the upper end of the separator-rod has an open bearing 451 for the reception of the journal of the separator-rail, and a rest 461 receiving the impact of a stop 462 moving in unison with the separator-rail as the latter turns, the said rest 461, and stop 462, serving to terminate the rotation of the separator-rail, and the separators carried thereby, when the separators have reached their operative position between the spindles. The construction of the parts in each case is such as to enable the separator-rail and separators to be removed directly and unobstructedly from the supports and from the machine at any time, without the separators previously having been disturbed from the position occupied by them when at work, or without having been shifted materially from such position, and thereby it is made unnecessary to provide for the disengagement of the rail from its supports by first turning the separators into their raised and idle or inoperative position. The stop 462, preferably, is carried by one of the separators, as in Figs. 27 to 31, but it may be carried by a separate collar 4691 slipped upon the separator-rail and secured in position thereon by a clamping-screw 4692 as in Fig. 35. When the stop 462 is formed on a separator it is formed on that separator which is next adjacent to the socket 361.

In Fig. 27 the walls 452 and 453 in front and in rear of the bearing 451 are slightly inclined rearwardly, in order that the front wall may serve to guard the more effectually against accidental rise of the journal of the separator-rail from the bearing, while in Figs. 28 and 29 the walls are both vertical, being of sufficient height to insure the retention of the journal. In Figs. 30 and 31 they are vertical also, but the arrangement of the rest 461 and the stop 462 is such as to permit the front wall 452 to be made very low.

The rest 461 in Fig. 27 is inclined downwardly and forwardly away from the socket, on a line substantially parallel with that of the inclination of the walls of the bearing 451. It will be seen that in Figs. 28 and 30, also, the part of rest 461 with which the stop 462 contacts, and against which the said stop 462 rests when the separators have reached their normal operative position is parallel with the walls of the bearing.

In none of the various modifications shown is there any obstruction to prevent the journal of the separator-rail from being moved directly and unobstructedly from its bearing without the separators previously having been turned from the position occupied by them when at work.

In the case of the constructions which are represented in Figs. 27, 28, and 29, the stops 462 are located on the front sides of the sockets 361. In these, the effect of the weight of the portions of the separators which project in front of the separator-rail, and which bears the stops 462 into contact with the rests 461, is to draw the journal of the separator-rail firmly to its seat in the bearing 451, and to keep it firmly drawn forward in the bearing so as that the front wall of the latter shall constitute an obstacle to prevent any upward movement of the journal in the curved path which it would follow if the parts were able to turn on the stop 462 as a pivot.

The stop 462 in the construction represented in Figs. 30 and 31 is located at the rear of the separator-rail and projects to the rear of the socket 361, while the rear wall 453 of the bearing 451 is prolonged upward and the rear side thereof is formed with the rest 461. In this construction, when the separators are turned forward the stop 462 strikes against the rest 461 as soon as the separators have reached their proper position. The stop 462 then acts as a pivot, and the weight of the parts to the front thereof bears the journal of the separator-rail down into its seat in the bearing 451. When the separators are thrown backward from between the spindles they may, if desired, in all these constructions, rest against the roller-beam 1, as indicated in Figs. 27 and 30. Or, in the case of the construction which is shown in Figs. 30, 31 and 35, the stop 462 may be allowed to strike against the lower portion of the socket 36, and thus arrest the movement of the separators when they have reached the proper inoperative position. The acting surfaces or portions of the rests 461 preferably are formed as narrow projecting parts of the sockets, they being located at mid-width of the sockets and preferably of semi-cylindrical or angular outline where the stops 462 touch them. When the separators are in their usual operative positions the stop 462 presses against the narrow projection, while at the same time the journal of the separator-rail presses against the interior of the bearing of the support. From this it results that if the separator-rail socket should, from any accidental cause, become slightly turned on its vertical axis, the pressure of the stop 462 upon the narrow projection, and the pressure of the journal of the separator-rail against the interior of the bearing, will restore the socket-bearing to parallelism with the separator-rail. Preferably, the face of the stop 462 which bears against the rest 461 is made of a cylindrical curve, such curve forming part of a cylinder of small diameter parallel to the axis of the separator-rail.

A convenient mode of constructing the separator is shown in Figs. 32, 33, and 34. In these views the separator is shown formed of two parts, namely a slotted plate or blade 205 and a hub 201. The hub is of cast-metal, preferably brass, but malleable iron would answer in some cases. The plate or blade and the hub are secured together in the following manner. The stem or narrow end of the plate or blade has formed therethrough a number of holes 204, which are indicated by the dotted circles in Fig. 32. Before casting the hub 201, the plate or blade 205 is set in the sand mold in which the said hub is to be cast, and the molten metal on being poured into the mold incloses the end of the plate or blade and fills the holes 204 in the latter so that, as clearly shown in Fig. 34, integral portions of the cast hub are molded into and extend through the holes in the plate or blade, and the said hub and plate or blade are firmly and securely held together. Through the hub is tapped a threaded hole into which is fitted a clamping-screw 203. The hub is slipped or threaded upon the separator-rail, and is held in the desired position thereon by the screw 203, the end of which takes bearing against the separator-rail.

I do not claim broadly herein the combination with the separator-rail and a stop moving in unison therewith of a support provided with an open bearing for the rail-journal and also with a rest without obstruction to interfere with the stop while the rail is being removed, for this is not of my invention. Nor do I claim specifically herein the combination, with a separator provided with a stop, of a support having an open bearing, and also a narrow projecting rest at the rear side thereof without obstruction to interfere with the stop while the rail is being removed, as represented in Figs. 30 and 31 of the drawings, for this has been made the subject of specific claim in my application for Letters Patent filed February 10, 1893, Serial No. 461,743.

I claim as my invention—

1. The combination with the cross-shaft, and its arm, of the separator-lever operated by the said arm, the separator-rail and separators, and connections intermediate the said separator-rail and the said separator-lever whereby the former is moved vertically from the latter, substantially as described.

2. The combination with the cross-shaft, and its arm, of the lifting-rod actuated by the said arm, the ring-rail, the separator-lever also operated by the said arm, the separator-rail and separators, and connections intermediate the said separator-rail and the said separator-lever whereby the former is moved vertically from the latter, substantially as described.

3. The combination with the cross-shaft, and its arm, of the separator-lever operated by the said arm, the separator-rod operated by the said lever, and the separator-rail and separators, substantially as described.

4. The combination with the cross-shaft, and its arm, of the lifting-rod actuated by the said arm, the ring-rail, the separator-lever also actuated by said arm, a separator-rod actuated by the said lever, and a separator-rail and separators, substantially as described.

5. The combination with the cross-shaft, and its arm carrying a stud or roller, of the separator-lever formed with a slot entered by the said stud or roller and also formed with a second slot, the separator-rod carrying a stud or roller entering the said second slot in the separator-lever, and a separator-rail and separators, substantially as described.

6. The combination with the cross-shaft, and its arm carrying a stud or roller, of the lifting-rod actuated by said arm, the ring-rail, the separator-lever formed with a slot entered by the said stud or roller and also formed with a second slot, the separator-rod carrying a stud or roller entering the said second slot in the separator-lever, and a separator-rail and separators, substantially as described.

7. The combination with the cross-shaft, and its arm, a stud or roller carried by the said arm, and means whereby said stud or roller is adjusted in the direction of the length of the said arm, of a separator-lever which is acted upon by the said stud or roller, a separator-rod, and a separator-rail and separators, substantially as described.

8. The combination with the cross-shaft and its arm, a stud or roller carried by the said arm, and means whereby said stud or roller is adjusted in the direction of the length of the said arm, of a separator-lever having a slot in one end thereof which is entered by the said stud or roller, a separator-rod operatively connected with the said separator-lever, and a separator-rail and separators, substantially as described.

9. The combination with the cross-shaft, the cross-shaft arm, the separator-lever actuated by the said arm, the separator-rod actuated by the said lever, the separator-rail, the separators, the bracket or stand serving for the pivotal support of the lever, and means for effecting adjustment of the said bracket or stand in the direction of the length of the said lever, substantially as described.

10. The combination with the cross-shaft, the cross-shaft arm, the studs or rollers carried by the said arm, the lifting-rod operated by one of the said studs, the ring-rail, the separator-lever operated by the other of the said studs, the separator-rod actuated by the said lever, the separator-rail, the bracket or stand serving for the pivotal support of the lever, and means for effecting adjustment of the said bracket or stand in the direction of the length of the said lever, substantially as described.

11. The combination with the cross-shaft, the cross-shaft arm, the studs or rollers carried by the said arm, the lifting-rod operated by one of the said studs, the ring-rail, the separator-lever operated by the other of the said studs, the separator-rod actuated by the said lever, the separator-rail, the bracket or stand serving for the pivotal support of the lever, and means for effecting sidewise adjustment of the said bracket or stand, substantially as described.

12. The combination with the cross-shaft, the cross-shaft arm, the studs or rollers carried by the said arm, the lifting-rod operated by one of the said studs, the ring-rail, the separator-lever operated by the other of the said studs, the separator-rod actuated by the said lever, the separator-rail, the bracket or stand serving for the pivotal support of the lever, and means for effecting adjustment of the said bracket or stand in the direction of the length of the said lever, and also sidewise, as desired, substantially as described.

13. The combination with the cross-shaft, and its arm, of the separator-lever operated by the said arm, a pivotal support for the said lever, means for adjusting vertically the said pivotal support, a separator-rod operated by the said lever, and a separator-rail and separators, substantially as described.

14. The combination with the cross-shaft, and its arm carrying a roller or stud, of the separator-lever having a slot in one end thereof which is entered by the said stud or roller, and a second slot in an intermediate portion of its length, a pivotal support for the other end of said lever, means for adjusting vertically the said pivotal support, a separator-rod carrying a stud or roller entering the second slot aforesaid, and a separator-rail and separators, substantially as described.

15. The combination with a separator-rail, and separators, of a two-part separator-lever having one part or member thereof operatively connected with the separator-rail, means for adjusting said parts or members laterally relatively to each other, and means acting on the other part or member for vibrating said lever and moving the separator-rail and separators, substantially as described.

16. The combination with the cross shaft, and the cross-shaft arm carrying a stud or roller, of a two-part separator-lever having one of the members thereof acted upon by the said stud or roller, means for adjusting the two members laterally relatively to each other, a separator-rod acted upon by the other of said members, and a separator-rail and separators, substantially as described.

17. The combination with the cross shaft, its arm, and a stud or roller carried by the said arm, of a two-part separator-lever provided with a slot in each member thereof, the slot in one member receiving the stud or roller on the said arm, means for adjusting the two members laterally with relation to each other, the separator-rod provided with a stud or roller working in the slot in the other member, and the separator-rail and separators, substantially as described.

18. The combination with the cross-shaft, and its arm, provided with a stud or roller, of a two-part separator-lever having one of the members thereof acted upon by the said stud or roller, means for adjusting laterally relatively to each other the two members of the said lever, the separator-rod acted upon by the other of the members, the pivotal support for the lever, and means for adjusting the said pivotal support vertically, substantially as described.

19. The combination with the cross-shaft, and the cross shaft arm carrying a stud or roller, of the two-part separator-lever having in each member thereof a slot and in one of which slots the said stud or roller plays, means for adjusting the two parts or members of the lever laterally relatively to each other, the separator-rod carrying a stud or roller which plays in the other of the said slots, the separator-rail, the separators, the pivotal support for the said lever, and means for adjusting the said support vertically, substantially as described.

20. The combination with the cross-shaft, and the cross-shaft arm composed of two parts or members and provided with means for securing angular adjustment, of the ring-rail, means for transmitting movement to the same from one of the said parts or members, the separator-rail, and means for transmitting movement to the same from the other of the said parts or members, substantially as described.

21. The combination with the cross-shaft, the cross-shaft arm composed of two parts or members, one of the said parts or members being fixed to turn with the said shaft and the other fitted to move around the axis of the shaft, and means for holding the said movable part in the desired position of angular adjustment relatively to the fixed part, of the ring-rail, means for transmitting movement to the ring rail from the fixed part or member, the separator-rail, and means for transmitting movement from the adjustable part or member to the separator-rail, substantially as described.

22. The combination with the cross-shaft, of the cross-shaft arm composed of two parts or members and provided with means for securing angular adjustment, the lifting-rod operated by one of the members of the said arm, the ring-rail, the separator-lever operated by the other of said members, the separator-rod, and the separator-rail, substantially as described.

23. The combination with a separator-rail socket, of a tubular separator-rod having the said socket fitted thereon, and also having exterior swells or enlargements at opposite sides of the socket to keep the socket in place on the rod, substantially as described.

24. The combination with a foot, of a tubular separator rod having the said foot fitted thereon, and also having exterior swells or enlargements at opposite sides of the foot to keep the foot in place on the rod, substantially as described.

25. The combination with a separator-rail socket, and a foot, of a tubular separator-rod having the said socket and foot fitted thereon, and also having exterior swells or enlargements at opposite sides of the socket and the foot to keep both of the latter in place on the rod, substantially as described.

26. The combination with a separator-rail socket, and a foot, each having a countersunk portion such as described, of a tubular separator-rod having an exterior swell or enlargement near each end thereof to hold in place the part which is applied to the latter, and having the extremities thereof expanded to occupy the countersunk portions aforesaid and keep the socket and foot on the ends of the rod, substantially as described.

27. The combination with the separators, the separator-rail, the separator-rod, its foot or shoe, means for acting against said foot or shoe to move vertically the separator-rod and the devices carried thereby, the parts having capacity for adjustment to enable the traverse of the separator-rod and separators to be shifted or translated vertically, and a supporting rail or rails, of the stand or bracket 231 having the guiding arm 371 extending upward into close proximity to the lower limit of the traverse of the projecting parts carried at the upper end of the separator-rod and also having the guiding arm 381 extending downward into close proximity to the upper limit of the traverse of the foot or shoe, and means for securing the said stand or bracket to the supporting rail or rails with capacity for vertical adjustment to compensate for vertical adjustment or shift of the traverse of the separator-rod and parts connected therewith, substantially as described.

28. The combination with the separators, the separator-rail, the separator-rod having the socket affixed to the upper end thereof, the foot or shoe affixed to the lower end thereof, and the bushings slipped upon the intermediate portion thereof, and means acting upon the foot or shoe to move vertically the separator-rod and parts connected therewith, of the stand or bracket 231 having the arms 371 and 381 with holes therein for the reception of the bushings and lateral openings or slots leading into such holes of dimensions permitting the lateral passage of the rod but retaining the bushings in place, and means for securing the bushings in the holes, substantially as described.

29. The combination with the separators, the separator-rail, and a stop moving in unison with the said separator-rail, of a support constructed to permit the separator-rail to be unobstructedly removed therefrom before the separators have been turned out of their operative position, it having the open bearing from which the rail-journal may be removed directly and on its front portion a rest without obstruction to interfere with the stop while the rail is being removed, substantially as described.

30. The combination with the separators, the separator-rail, and a stop moving in unison with the separator-rail, of a support constructed to permit the separator-rail to be unobstructedly removed therefrom before the separators have been turned out of their operative position, it having the open bearing with the forward wall thereof slightly inclined rearwardly and from which the rail-journal may be removed directly, and on its front portion a rest without obstruction to interfere with the stop while the rail is being removed, substantially as described.

31. The combination with the separators, the separator-rail, and a stop moving in unison with the separator rail, of a support provided with a bearing for the rail and also having a narrow projecting part or rest to form a bearing for the said stop, whereby the bearing is brought into parallelism with the separator-rail, substantially as described.

32. The combination with a separator-rail and the separator provided with a stop, of a support constructed to permit the separator-rail to be unobstructedly removed therefrom before the separators have been turned out of their operative position, it having the open bearing from which the rail-journal may be removed directly and also the rest without obstruction to interfere with the stop while the rail is being removed, substantially as described.

In testimony whereof I affix my signature in the presence of two witnesses.

CHANNING WHITAKER.

Witnesses:
SAML. G. STEPHENS,
MARY CAVERLY.